United States Patent [19]
Kuhlmann

[11] Patent Number: 5,802,225
[45] Date of Patent: Sep. 1, 1998

[54] ARRANGEMENT FOR TRANSMITTING DIGITAL DATA OVER AN OPTICAL NETWORK OF OPTICAL WAVEGUIDES

[75] Inventor: Holger Kuhlmann, Krummendeich, Germany

[73] Assignee: Daimler-Benz Aerospace Airbus GmbH, Hamburg, Germany

[21] Appl. No.: 808,243

[22] Filed: Feb. 28, 1997

[30]     Foreign Application Priority Data

Mar. 4, 1996 [DE] Germany .................. 196 08 172.6

[51] Int. Cl.[6] .................................................. G02B 6/26
[52] U.S. Cl. ........................... 385/44; 385/14; 385/15; 385/16; 385/39; 385/40; 385/47; 385/48; 385/33
[58] Field of Search .......................... 385/15, 16, 24, 385/31, 36, 39, 33, 34, 40, 44, 45, 46, 47, 48, 14

[56]             References Cited

U.S. PATENT DOCUMENTS

| | | | |
|---|---|---|---|
| 4,173,390 | 11/1979 | Kach | 385/44 X |
| 4,378,143 | 3/1983 | Winzer | 385/44 X |
| 4,747,653 | 5/1988 | Kahn | 385/44 X |
| 4,765,706 | 8/1988 | Marcatili et al. | 385/44 X |
| 5,305,401 | 4/1994 | Becker et al. | 385/24 X |

FOREIGN PATENT DOCUMENTS 0166550  2/1986  European Pat. Off. ............. 385/45 X

OTHER PUBLICATIONS

"Multireflection Optical Multi/Demultiplexer Using Interference Filters"; By Nosu et al.; May 29, 1979; #0013–5194.79./140414–0251.50/0.

*Primary Examiner*—Brian Healy
*Attorney, Agent, or Firm*—W. F. Fasse; W. G. Fasse

[57]             ABSTRACT

Digital data in the form of a light signal is to be transmitted through an optical network of optical waveguides joined together at passive node points. The node points split or branch off the light signal from a primary waveguide into secondary or branch waveguides. The passive node points include special coupling surfaces respectively a coupling body including a flat surface and a prismatic structure arranged at the junction or head end of the secondary waveguide. The respective coupling surface or coupling body achieves an exactly defined maximum reflection of the light in the primary waveguide, i.e. constrains a major proportion of the light within the primary waveguide. Thus, maximum light power is maintained and transmitted along the primary waveguide, and at each node point a defined minimum light power is coupled into the respective secondary waveguides. In this manner, the overall light power transmission along the primary waveguide is increased and a greater number of passive node points can be used in the optical network.

33 Claims, 3 Drawing Sheets

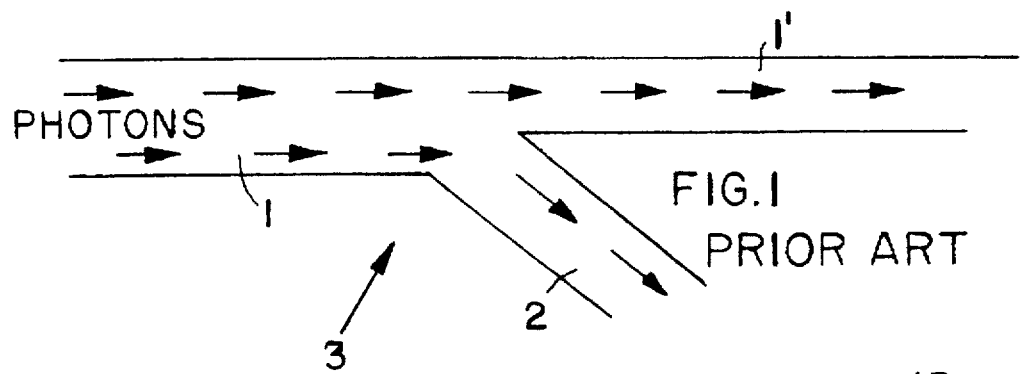
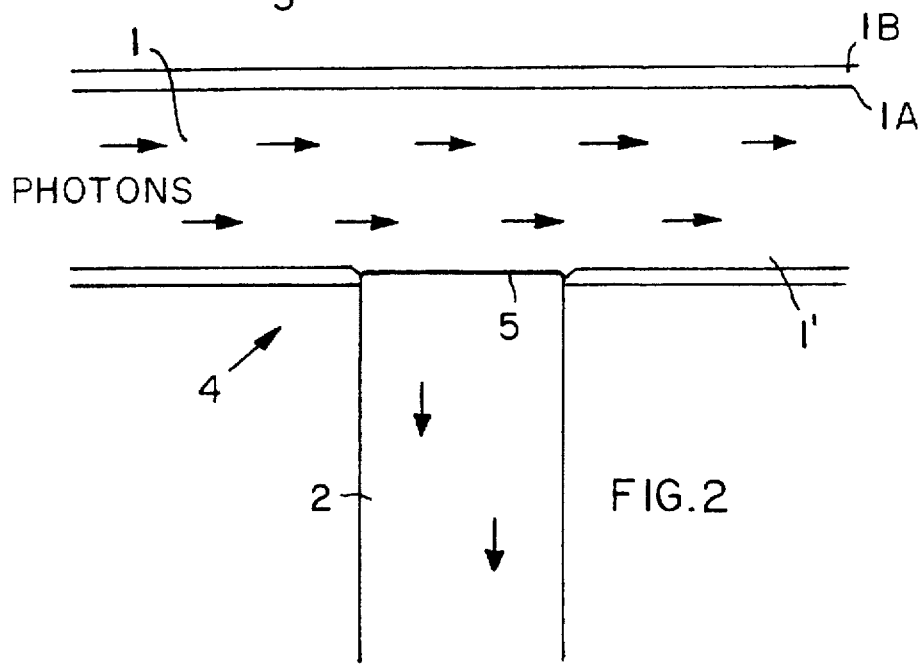
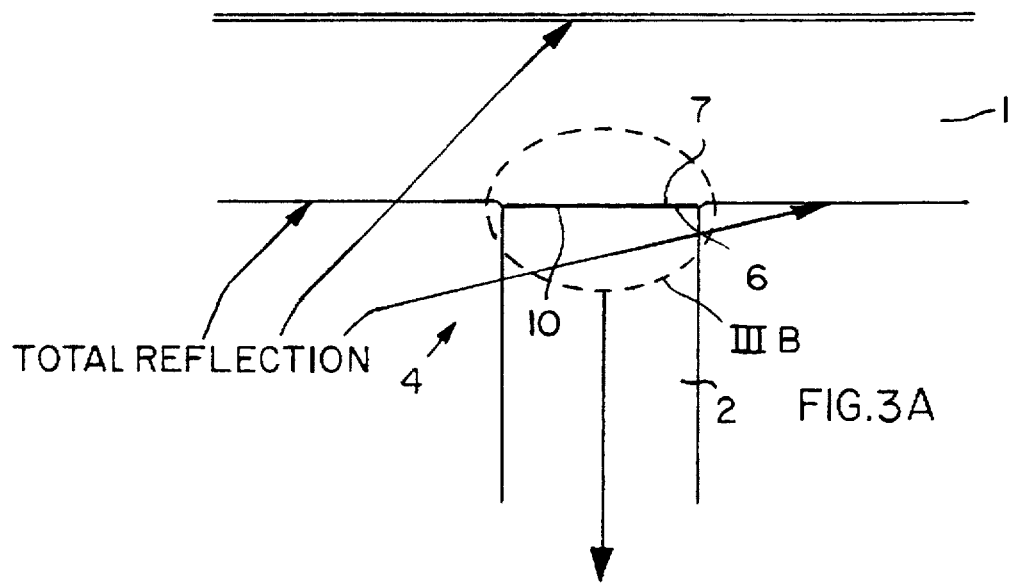

ARRANGEMENT FOR TRANSMITTING DIGITAL DATA OVER AN OPTICAL NETWORK OF OPTICAL WAVEGUIDES

FIELD OF THE INVENTION

The invention relates to an arrangement for transmitting digital data over an optical network comprising optical or light waveguides coupled together, wherein the connections between or among the optical waveguides form passive node points that divide the digital data being transmitted in the form of light among the coupled optical waveguides.

BACKGROUND INFORMATION

The transmission of light signals representing digital data over an optical medium, and particularly a network of optical waveguides, is known in general. The topology of such optical conductor networks, in other words the teachings in the art regarding the position and arrangement of such geometrical structures or systems in space, is mostly carried out on a point to point basis. Since there is loss in the light signal strength over the length of the optical conductor network and at each connection point, known optical conductor networks require repeaters or amplifiers in order to amplify the light signal in any case in which the light signal must be transmitted over a long transmission distance.

An alternative to the use of repeaters or amplifiers is represented by a ring architecture of an optical network. In such a ring-network, the light signal representing digital data is regenerated at each node point before it is further transmitted to the next node point. In other words, the node points are active node points that do not merely passively connect and allow passage of the light signal from one optical conductor to the next, but rather actively regenerate or amplify the signal at each node point. It is a disadvantage that such ring-networks involve substantially greater costs and complexity due to the use of amplifiers and active nodes, in comparison to the above described bus bar topology using passive node points.

On the other hand, the bus topology using passive node points can only be realized in practice with a limited number of node points, because too much of the transmitted light power is lost from the main conductor and coupled into the branch or tap conductor at each node point. For example, when two optical waveguides or conductors are joined together at a generally known passive node point, about 50% of the light signal, e.g. 50% of the transmitted light power or of the transmitted data, is branched off into the second branch conductor from the first conductor. Thus, with such a known passive node point, approximately the same light power is transmitted in both of the continuing branch conductors downstream of the node point, and only 50% of the light power remains in the main conductor downstream of the node point. This situation is represented in FIG. 1, which schematically shows a passive Y-node point or junction according to the prior art.

OBJECTS OF THE INVENTION

In view of the above it is the aim of the invention to achieve the following objects singly or in combination:
- to provide an arrangement for transmitting digital data in the form of light over an optical network made up of optical waveguides joined together at passive node points, which achieves an improvement in the light power transmitted downstream of the node points, especially in the primary waveguide;
- to provide such an arrangement and especially a passive junction node construction therefor, so that a smaller proportion of light power can be branched off into respective branch or tap light conductors, while the major proportion of the transmitted light power is maintained and transmitted in the main or primary light conductor at each node point;
- to provide such an arrangement and particularly a passive node structure, whereby a substantially increased number of passive node points can be used in a passive optical network while still maintaining sufficient transmitted light power levels for effectively transmitting the digital data;
- to provide such an arrangement and especially such a passive node structure that allows a particular defined proportion of light power to be tapped or branched off from the main light conductor; and
- to provide such an arrangement that avoids the need of using active amplifiers for transmitting digital data over the network.

SUMMARY OF THE INVENTION

The above objects have been achieved in an arrangement of an optical waveguide network, and particularly using passive junction nodes according to the invention, wherein the node points respectively comprise coupling surfaces arranged at the inlet end area of an associated tap or branch optical waveguide. The coupling surfaces are so configured and embodied so that they achieve a larger, preferably maximum, exactly defined reflection of the light signal being transmitted in a main or primary optical waveguide, and thereby achieve a greater, or preferably maximum, transmission of the light power along the primary waveguide to the next downstream node point, and simultaneously split or branch-off a defined smaller, or preferably minimum, light power into the branch waveguide provided with the respective coupling surface at the respective node point.

A substantial advantage achieved by the invention is that the present arrangement for transmitting digital data in the form of light signals over an optical network can be realized on a much larger scale, with more node points, and without requiring any amplifiers. Furthermore, an exactly defined minimum power level can be branched or tapped-off from the main optical conductor at each node point, as necessary for still being able to detect or read the digital data represented by the light signal.

According to a first possible embodiment of the invention, the node point is an optical-optical node point. In a second possible embodiment of the invention, a respective node point is an optical-electrical node point. The different types of node points can also be mixed within a single network arrangement.

According to a detail of the invention, an optical-optical node point may include an optical coupling body comprising a flat surface forming the coupling surface adjoining the main waveguide and comprising a prism structure on its side opposite the flat surface, i.e. facing toward the secondary or branch waveguide. More specifically, the flat surface of the coupling body is directed toward the light waveguide transmitting the greater or maximum light power, and the prism structure is directed toward the light waveguide that will receive and convey the defined, split-off smaller or minimum light power.

The optical-electrical node point according to the invention may specifically comprise an optical coupling body and an electrical opto-coupler arranged downstream of the optical coupling body.

According to the invention, the coupling bodies arranged at the node points may be made of polycarbonate or any known optical transmission medium, and/or may respectively comprise a lens system.

BRIEF DESCRIPTION OF THE DRAWINGS

In order that the invention may be clearly understood, it will now be described, by way of example, with reference to the accompanying drawings, wherein:

FIG. 1 shows a passive Y-node point according to the prior art;

FIG. 2 shows an optical-optical node point including a coupling body with coupling surfaces according to the invention;

FIG. 3A schematically shows a node point coupling together two light conductors or optic waveguides using a coupling body according to FIG. 2;

Figure 3B:
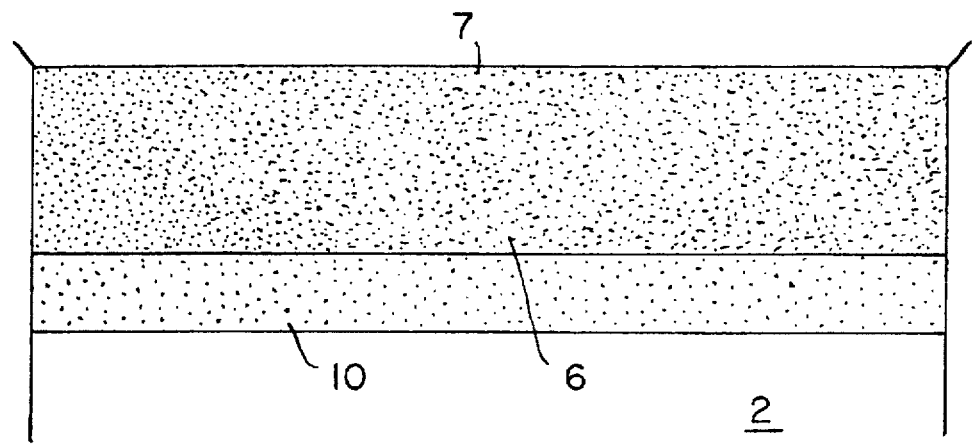
FIG. 3B shows an enlarged detail view of the coupling body in the detail area IIIB of FIG. 3A.

DETAILED DESCRIPTION OF PREFERRED EXAMPLE EMBODIMENTS AND OF THE BEST MODE OF THE INVENTION

FIG. 1 shows a junction between two optical waveguides or light conductors according to the prior art, wherein a second or secondary waveguide 2 is joined onto and branches off from a first or primary waveguide 1 at a passive Y-junction node point 3. The arrows symbolically represent light particles or photons representing a light signal having a certain light power that is transmitted in the waveguide 1 and is then split or branched off at the node point 3. As discussed above, for example, about 50% of the light power that is initially transmitted in the primary waveguide 1 is branched off into the secondary waveguide 2, so that the light power remaining in the primary waveguide portion 1' downstream of the node point 3 is also about 50% of the original light power. Thus, each successive node point 3 along the primary waveguide 1 will again halve the light power level being transmitted therein, as discussed below.

FIG. 2 shows an optical-optical junction or node point 4 according to the invention, arranged between a primary light waveguide or conductor 1, and a secondary or branch waveguide or conductor 2. The light waveguide 1 may, for example, have a surface cladding layer 1A thereon, which constrains the light signal, i.e. the photons, to be transmitted within the light waveguide 1 by being internally reflected therein. A protective sheath 1B may be provided around the surface cladding layer 1A of the light waveguide 1. At the site of the node point 4, i.e. where the secondary waveguide 2 is joined to the primary waveguide 1, the protective sheath 1B is removed or opened, and the cladding layer 1A is partially removed, completely removed, or left intact as required for the particular transmission characteristic to be achieved. Thus, as shown in FIGS. 2 and 3, the coupling body 6 (described below) does not encroach into a cross-section of the primary waveguide 1. Thus, as shown in FIGS. 2 and 3, the coupling body 6 having a coupling surface 5 (described below) does not encroach into a cross-section of the primary waveguide 1.

The node point 4 achieves a substantially improved light power transmission along the primary waveguide 1. This node point 4 comprises a specially embodied coupling body 6 having a coupling surface 5 arranged directly adjacent the interface between the conjoined waveguides 1 and 2. The coupling body 6 is embodied in such a manner that a particular desired, i.e. defined, reflection of the light signal is achieved at the node point 4. Preferably, a maximum exactly defined reflection of the light is achieved, while leaking or coupling a defined minimum amount of light into the secondary waveguide 2 as required for the particular application. Thus, this arrangement achieves a maximum light power transmission along the primary waveguide 1, through the coupling body 6 downstream of the node point 4 leading to further successive node points, and couples a defined minimum light power into the secondary waveguide 2 through the coupling body 6.

The degree of reflection of the light from the coupling surface 5 so that the light is constrained within the primary waveguide 1, and correspondingly the degree of splitting of the light power into the secondary waveguide 2, mainly depends on the described surfaces of the coupling body 6. Additionally, it can be controlled or selected based on the physical configuration, e.g. the diameter (total area) of the surfaces and the diameter of the waveguides 1 and 2 and the difference in the relative refractive indices of the transmission medium of the waveguide 1 in comparison to the coupling body 6. For example, the coupling body 6 may include a coating layer of a material having a different refractive index. The features of the coupling body 6 in conjunction with the respective angle of incidence of light rays onto the coupling body 6 will determine the degree of light coupling or transmission from the waveguide 1 into the waveguide 2 through the coupling body 6. A particular percentage of the light power to be coupled into the secondary waveguide 2 can be achieved by embodying the coupling body 6 in such a manner that only the portion of light represented by rays having an incidence angle above a particular cut-off angle will be allowed to pass through the coupling body 6 and into the conductor 2. Furthermore, the light being transmitted can be split or coupled into the secondary waveguide 2 depending upon the particular wavelength of the light.

The degree of coupling can also be affected by the junction angle of the secondary waveguide 2 with the primary waveguide 1. As shown in FIG. 2, a preferred arrangement involves the primary waveguide 1 continuing in a substantially straight path through and past the node point 4, with the secondary waveguide 2 joined to the primary waveguide 1 at a substantially right angle at the node point 4. The primary waveguide may thus be a continuous uninterrupted light conductor that extends through the area of the node point 4.

FIGS. 3A and 3B schematically show a particular embodiment of an optical-optical node point 4 having an optical coupling body 6 providing or arranged at two coupling surfaces 7 and 10. As shown in the detail view of FIG. 3B, the coupling surfaces 7 and 10 are provided by the coupling body 6, which is made of polycarbonate plastic for example. The coupling body 6 comprises a flat surface 7 at the interface with the primary waveguide 1 and a prism structure 10 on the side opposite the flat surface 7. Thus, the flat surface 7 faces toward the primary waveguide 1 that is to transmit the maximum light power, and the prism structure 10 faces toward the secondary waveguide 2 into which the defined minimum light power is to be branched or coupled.

With the present arrangement, the coupling body 6 achieves the desired, controlled reflection and coupling of desired proportions of light, such that a desired major or maximum proportion of the light power is reflected from the coupling body 6 and thereby constrained within the primary waveguide 1, while a defined minor or minimum light power portion is coupled into the secondary waveguide 2. According to the invention, the maximum proportion of the light power may be at least 90%, more preferably at least 95%, even more preferably at least 90%, or especially at least 95%, or at least 98%, or at least 99.99%, or at least 99.999%, of the light signal in the primary waveguide 1 just upstream of the node point 4. Correspondingly, the minimum proportion of the light power may for example be not more than 10%, or more preferably not more than 5%, or still more preferably not more than 2%, or especially not more than 1%, or not more than 0.1%, or not more than 0.01% or not more than 0.001%, depending on the required light signal power in the branch or secondary waveguide.

Figure 4:
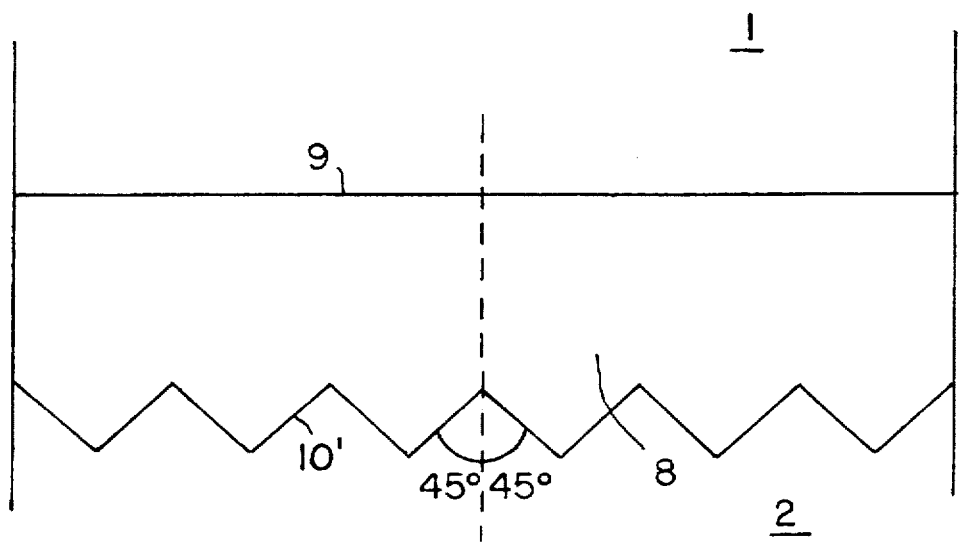
FIG. 4 schematically shows an enlarged side or end view of the coupling body shown in FIGS. 3A and 3B, for example as seen from the right side of the views of FIGS. 3A and 3B.

FIG. 4 shows a detail view of a particular embodiment of the coupling body having a prism structure 10. In FIG. 4, which is for example an end or side view relative to the front view of FIG. 3B, a particular coupling body 8 has prismatic ridges 10' forming the prism structure 10 at the interface with the secondary waveguide 2, while a flat surface 9 is at the interface with the primary waveguide 1. The prismatic ridges 10' extend generally parallel to the lengthwise axis of the primary waveguide 1, and have sloped ridge faces extending at an angle of about 45° relative to the lengthwise axis of the secondary waveguide 2 in the present embodiment. Thus, the prismatic ridges 10' are defined by sloped faces extending at an angle of about 90° relative to each other. The combination of the flat surface 9 with the prismatic ridges 10' in the coupling body 8 achieves the desired selected reflection and coupling characteristic, for example most of the transmitted light power is constrained within the primary waveguide 1, and only a small controlled proportion, e.g. 2%, of the total light power is coupled into the secondary waveguide 2. The transmission, i.e. coupling, versus reflection characteristics are controlled by the well known laws of optics.

Figure 5:
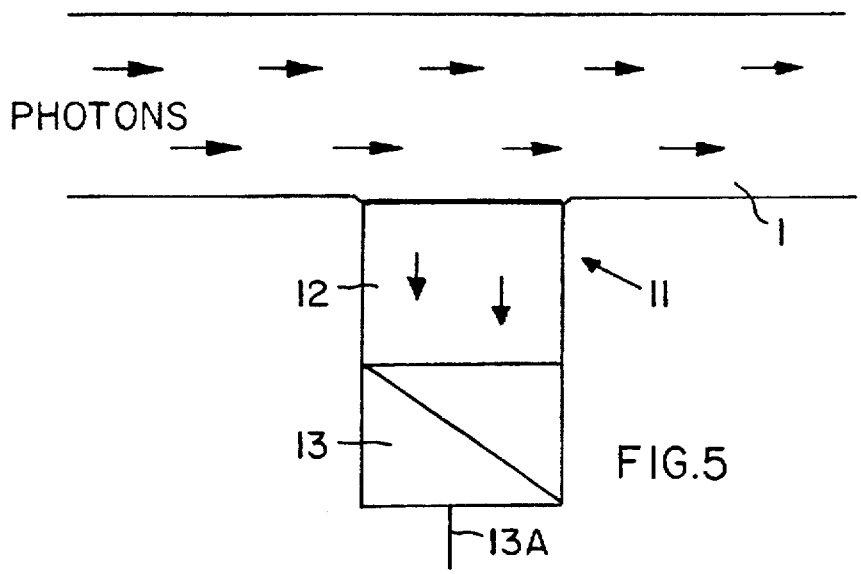
FIG. 5 shows an optical-electrical node point using a coupling body according to the invention.

FIG. 5 shows an example embodiment of an optical-electrical node point 11 according to the invention. This node point 11 is formed by an optical coupling body 12 and an opto-coupler 13, which is a component known in the art, connected downstream of the optical coupling body 12. The optical coupling body 12 may correspond to the coupling bodies 6 and 8 described above, for example. The opto-coupler 13 receives the light signal being coupled through the coupling body 12, and outputs a corresponding electrical signal on an electrical conductor 13A. The components are arranged in direct proximity to the node point 11 within the waveguide 2, or forming the junction end of the waveguide 2, whereby the coupling body 12 is arranged directly proximate to the waveguide 1. The present coupling body 12, just as the above described coupling bodies 6 and 8, can be made of a polycarbonate plastic.

Figure 6:
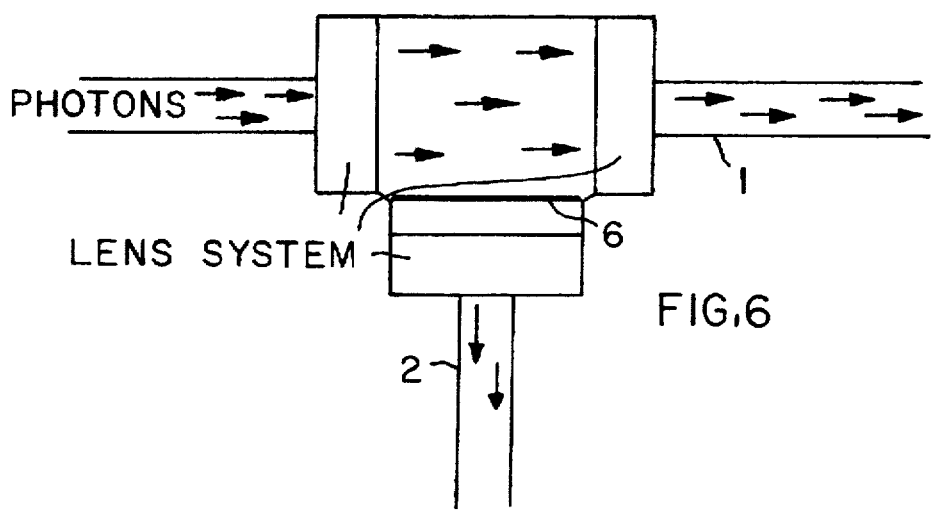
FIG. 6 shows a coupling body using a lens system according to the invention.

FIG. 6 shows a node point formed by a coupling body using a lens system. A lens is interposed between the coupling body 6 and the inlet end of the secondary waveguide 2. With this embodiment, it is possible to practically realize node points having larger dimensions, while coupling the branch signal into a relatively smaller secondary waveguide, if desired.

Using any of the above described embodiments of a node point according to the invention, and particularly using the coupling bodies 6, 8, or 12, it is possible to achieve the above described improvement of the transmission of the light power along the main waveguide 1, based on the well known physical laws of optics.

In other words, a person of ordinary skill in the art will be able to adjust the particular characteristics of the components according to the invention to achieve the desired coupling ratio based on the laws of optics. While the prior art arrangement shown in FIG. 1 branches or splits off about 50% of the transmitted light power at each successive one of the node points, the node technology according to the invention makes it possible to branch or split off a much smaller defined fraction of the light power, for example only 2% of the light power, being transmitted along the primary waveguide at each node point. The significance of this feature will now be made clear by comparing the invention to the prior art in connection with the network system shown in FIG. 7 and the data presented in Table 1 below.

Figure 7:
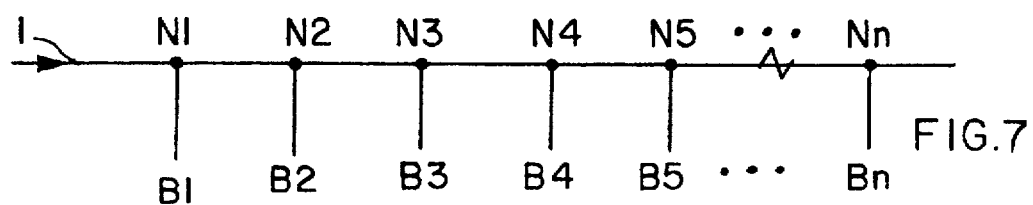
FIG. 7 shows an exemplary network of a major or primary optic waveguide with a plurality of nodes respectively branching off into plural branch waveguides.

FIG. 7 shows a representative example optical network in which a primary waveguide 1 has a plurality of nodes N1, N2, N3, N4, ... Nn, arranged in series therealong with respective branch waveguides B1, B2, B3, B4, ... Bn branching off from the respective node points. Assume that reliable detection of the light signal in the system requires at least 0.8% of the light power that is output by a light source and fed into the head end of the primary waveguide 1. Thus, for the signal to be detectable in each branch waveguide B1, B2, B3, ... Bn, each node N1, N2, N3, ... Nn must couple at least 0.8% of the original source light signal power into the respective branch waveguide, and at least 0.8% of the original source light signal power must be maintained in the primary waveguide 1 to the tail end thereof. The following Table 1 shows the percentage light power level (relative to the original light source power level) that is branched off at each node, i.e. into each of the branch waveguides B1, B2, B3, ... Bn.

TABLE 1

| | Light Power (%) Branched Off at Each Node | |
|---|---|---|
| Node Number | Prior Art | Invention |
| 1 | 50.00% | 2.00% |
| 2 | 25.00% | 1.96% |
| 3 | 12.50% | 1.92% |
| 4 | 6.25% | 1.88% |
| 5 | 3.13% | 1.84% |
| 6 | 1.56% | 1.80% |
| 7 | (0.78%) | 1.76% |
| 8 | (too low to be detected) | 1.72% |
| ... | " | ... |
| 30 | " | 0.84% |
| 31 | " | 0.80% |

As seen from Table 1, the prior art arrangement allows only six branch points or nodes (or marginally seven nodes) to be used in a sequential arrangement, because with more nodes the signal is dissipated to a level that is too low to be detected, i.e. less than 0.8% in this example. In contrast, the present invention allows up to 31 node points to be used in a sequential or series circuit arrangement while providing a sufficient signal level in each of the respective branch waveguides.

As a further example, the node point structures according to the invention could be embodied so that only 1% of the respective light power is coupled into the respective branch waveguides. Further assume for this example that a light power level of only 0.4% of the original light source power level is required for the data to be detectable. In this case, the present inventive arrangement would allow sixty-one nodes to be used in sequence or series, while the prior art arrangement would only allow seven (or marginally eight) nodes to be used before the branched-off power level became too low to be detected.

In still another example, it is possible to use different node points having different coupling or reflection characteristics in series with one another. Thus, it is possible to arrange different node points such that each successive node point in the light transmission direction has a lower reflectivity and a correspondingly higher coupling of light into the respective branch waveguide than does the preceding node. These successively higher coupling ratios counteract the fact that the light power in the main waveguide will be decreased downstream of each node point, and respectively provide the same light signal power level in each one of the branch waveguides. For example, if it is desired to provide a light power level of 0.8% of the original source power level in each one of the branch waveguides B1, B2, B3, . . . Bn of FIG. 7, then the first node point N1 would be so embodied to couple 0.8% of the incident light power (100%) into the branch waveguide B1, the second node N2 would be so embodied to couple approximately 0.81% of the incident light power (99.2% of the original source power) into the branch waveguide B2, the third node N3 would be so embodied to couple approximately 0.814% of the incident light power (about 98.4% of the original source power) into the branch waveguide B3, the fourth node N4 would be so embodied to couple approximately 0.819% of the incident light power (about 97.6% of the original source power) into the branch waveguide B4, and so forth. With such a scheme, theoretically up to 125 nodes could be used, with each one of the 125 branch waveguides receiving 0.8% of the original light source power. In particular arrangements, at least 30, 50 or 500 nodes may be provided.

Alternatively, the nodes could be arranged in groups, for example with the first several nodes each providing a 1% coupling factor and a next group of nodes each providing a 2% coupling factor, etc., as necessary for coupling at least 0.8% of the original source power into each branch waveguide. This approach would not allow the 125 nodes as for the preceding example, but would be advantageous in view of standardization and simplicity.

From the above examples, it is clear that the present inventive node point coupling structures allow a much larger optical network to be configured, including a much greater number of nodes than was possible in prior art arrangements, without using active elements such as amplifiers or repeaters.

Although the invention has been described with reference to specific example embodiments, it will be appreciated that it is intended to cover all modifications and equivalents within the scope of the appended claims.

What is claimed is:

1. An optical network arrangement for transmitting a light signal therein, comprising
   a first optical waveguide,
   a second optical waveguide, and
   a passive node joining an inlet end of said second waveguide to said first waveguide such that said second waveguide forms a branch extending from said first waveguide and said passive node is adapted to couple a portion of said light signal from said first waveguide into said second waveguide,
   wherein said passive node comprises an optical coupling body arranged at said inlet end of said second waveguide,
   wherein said coupling body has a flat surface on a first side thereof and a prismatic surface structure at a second side thereof opposite said first side, and
   wherein said flat surface and said prismatic surface structure of said coupling body have a defined reflectivity characteristic such that a defined maximum proportion of said light signal that is present in said first waveguide just upstream of said passive node is transmitted to said first waveguide downstream of said passive node and such that a defined minimum proportion of said light signal that is present in said first waveguide just upstream of said passive node is coupled into said second waveguide.

2. The optical network arrangement of claim 1, wherein said first and second waveguides and said passive node are adapted to transmit digital data in said light signal therein.

3. The optical network arrangement of claim 1, wherein said minimum proportion and said maximum proportion are respective proportions of light power of said light signal.

4. The optical network arrangement of claim 1, including no active signal amplification devices.

5. The optical network arrangement of claim 4, comprising at least 500 of said passive nodes.

6. The optical network arrangement of claim 1, comprising a plurality of said second waveguides, and a plurality of said passive nodes respectively connecting inlet ends of said second waveguides to said first waveguide at plural node locations along said first waveguide, wherein said plural passive nodes respectively have different ones of said defined reflectivity characteristics.

7. The optical network arrangement of claim 6, wherein said different defined reflectivity characteristics of said plural passive nodes are such that each given one of said passive nodes provides a higher said defined minimum proportion of said light signal coupled into said respective second waveguide than does another one of said passive nodes located upstream of said given one of said passive nodes relative to a direction of transmission of said light signal in said first waveguide.

8. The optical network arrangement of claim 1, wherein said different defined reflectivity characteristics are such that an absolute light signal power level of said defined minimum proportion of said light signal coupled into said second waveguide is substantially equal for all said second waveguides.

9. The optical network arrangement of claim 1, wherein said defined maximum proportion is at least about 99% and less than 100%, and said defined minimum proportion is greater than 0% and not more than about 1%.

10. The optical network arrangement of claim 1, wherein said passive node is an optical-optical passive junction node.

11. The optical network arrangement of claim 1, wherein said coupling body is arranged at said inlet end of said second waveguide with said flat surface of said coupling body facing toward said first waveguide and said prismatic surface structure of said coupling body facing toward said second waveguide.

12. The optical network arrangement of claim 11, wherein said prismatic surface structure comprises a plurality of triangle profiled ridges and grooves extending substantially parallel to a lengthwise axis of said first waveguide at said passive node.

13. The optical network arrangement of claim 1, wherein said coupling body essentially consists of a polycarbonate plastic.

14. The optical network arrangement of claim 1, wherein said passive node further comprises a lens system interposed between said coupling body and said inlet end of said second waveguide.

15. The optical network arrangement of claim 1, wherein said first waveguide comprises a light conductor that is continuous and non-interrupted at and through a location at which said passive node joins said inlet end of said second waveguide to said first waveguide.

16. The optical network arrangement of claim 1, wherein said defined maximum proportion is at least about 99.9% and less than 100%, and said defined minimum proportion is greater than 0% and not more than about 0.1%.

17. The optical network arrangement of claim 1, wherein said prismatic surface structure comprises a plurality of triangle profiled ridges and grooves extending substantially parallel to a lengthwise axis of said first waveguide at said passive node.

18. The optical network arrangement of claim 1, wherein said first waveguide is left intact with no portion thereof removed at a cross-sectional location at which said passive node joins said inlet end of said second waveguide to said first waveguide.

19. The optical network arrangement of claim 18, further comprising a protective sheath around said first waveguide, wherein an opening is provided in said sheath at said cross-sectional location to allow said coupling body to join said inlet end of said second waveguide to said first waveguide while leaving said first waveguide intact.

20. The optical network arrangement of claim 1, wherein said coupling body does not encroach into a cross-section of said first waveguide.

21. An optical network arrangement for transmitting a light signal therein, comprising a first optical waveguide, at least 30 second optical waveguides, and at least 30 passive nodes respectively joining respective inlet ends of said second waveguides to said first waveguide at plural node locations therealong such that each said second waveguide forms a respective branch extending from said first waveguide and each said passive node is respectively adapted to couple a respective portion of said light signal from said first waveguide into a respective one of said second waveguides, wherein each said passive node comprises a respective coupling body arranged at said respective inlet end of said respective second waveguide, wherein each said respective coupling body has surfaces having a defined reflectivity characteristic such that a defined maximum proportion of said light signal that is present in said first waveguide just upstream of said respective passive node is transmitted to said first waveguide downstream of said respective passive node and such that a defined minimum proportion of said light signal that is present in said first waveguide just upstream of said respective passive node is coupled into said second waveguide, and wherein said network arrangement includes no active signal amplification devices between any of said passive nodes.

22. The optical network arrangement of claim 21, comprising at least 50 of said passive nodes.

23. The optical network arrangement of claim 21, comprising at least 500 of said passive nodes.

24. An optical network arrangement for transmitting a light signal therein, comprising a first optical waveguide, a second optical waveguide, and a passive node joining an inlet end of said second waveguide to said first waveguide such that said second waveguide forms a branch extending from said first waveguide and said passive node is adapted to couple a portion of said light signal from said first waveguide into said second waveguide, wherein said passive node comprises a coupling body arranged at said inlet end of said second waveguide, wherein said coupling body has surfaces having a defined reflectivity characteristic such that a defined maximum proportion of said light signal that is present in said first waveguide just upstream of said passive node is transmitted to said first waveguide downstream of said passive node and such that a defined minimum proportion of said light signal that is present in said first waveguide just upstream of said passive node is coupled into said second waveguide, and wherein said defined maximum proportion is at least 90% and less than 100%, and said defined minimum proportion is greater than 0% and not more than 10%.

25. The optical network arrangement of claim 24, wherein said defined maximum proportion is at least 95% and less than 100%, and said defined minimum proportion is greater than 0% and not more than 5%.

26. The optical network arrangement of claim 24, wherein said defined maximum proportion is at least 98% and less than 100%, and said defined minimum proportion is greater than 0% and not more than 2%.

27. The optical network arrangement of claim 24, wherein said defined maximum proportion is at least about 99% and less than 100%, and said defined minimum proportion is greater than 0% and not more than about 1%.

28. The optical network arrangement of claim 24, wherein said defined maximum proportion is at least about 99.9% and less than 100%, and said defined minimum proportion is greater than 0% and not more than about 0.1%.

29. The optical network arrangement of claim 24, wherein said defined maximum proportion is at least about 99.99% and less than 100%, and said defined minimum proportion is greater than 0% and not more than about 0.01%.

30. The optical network arrangement of claim 24, wherein said defined maximum proportion is at least about 99.999% and less than 100%, and said defined minimum proportion is greater than 0% and not more than about 0.001%.

31. An optical network arrangement for transmitting a light signal therein, comprising an optical waveguide, an electrical conductor, and an optical-electrical passive junction node joining an inlet end of said electrical conductor to said optical waveguide such that said electrical conductor forms a branch extending from said optical waveguide and said passive node is adapted to couple a portion of said light signal from said optical waveguide as an electrical signal into said electrical conductor, wherein said passive junction node comprises an optical coupling body arranged at said inlet end of said electrical conductor, and an opto-electrical coupler interposed between said coupling body and said inlet end of said electrical conductor, wherein said coupling body has a flat surface on a first side thereof and a prismatic surface structure at a second side thereof opposite said first side, and wherein said flat surface and said prismatic surface structure of said coupling body have a defined reflectivity characteristic such that a defined maximum proportion of said light signal that is present in said optical waveguide just upstream of said passive node is transmitted to said optical waveguide downstream of said passive node and such that a defined minimum proportion of said light signal that is present in said optical waveguide just upstream of said passive node is coupled through said opto-electrical coupler into said electrical conductor.

32. The optical network arrangement of claim 31, wherein said coupling body essentially consists of a polycarbonate plastic.

33. The optical network arrangement of claim 31, wherein said coupling body further comprises a lens system.

* * * * *

UNITED STATES PATENT AND TRADEMARK OFFICE
CERTIFICATE OF CORRECTION

PATENT NO. : 5,802,225
DATED : Sep. 1, 1998
INVENTOR(S) : Kuhlmann

It is certified that error appears in the above-identified patent and that said Letters Patent is hereby corrected as shown below:

| | | |
|---|---|---|
| Col. 4, | line 2, | after "1." delete "Thus, as shown in FIGS."; |
| | line 3, | cancel the entire line; |
| | line 4, | cancel the entire line; |
| | line 5, | cancel the entire line; |
| | line 19, | before "downstream" replace "through the coupling body 6" by --and particularly in the portion 1' of the light waveguide 1--; |
| Col. 5, | line 15, | after "least" (first occurrence) replace "90%," by --98%,--; |
| | line 16, | before "or" (first occurrence) replace "95%," by --99%,--; after "least" (first occurrence) replace "98%," by --99.9%,--; |
| Col. 6, | line 57, | after "As" insert --can be--; |
| Col. 8, | line 45, | after "claim" replace "1," by --7,--. |

Signed and Sealed this

Thirteenth Day of July, 1999

Attest:

Q. TODD DICKINSON

*Attesting Officer*  *Acting Commissioner of Patents and Trademarks*